(12) United States Patent
Lee

(10) Patent No.: US 11,702,214 B2
(45) Date of Patent: Jul. 18, 2023

(54) UNMANNED FLIGHT EQUIPMENT, ALARM DEVICE, AERIAL VEHICLE, AND ALARM DEVICE RELEASE APPARATUS

(71) Applicant: Rakuten Group, Inc., Tokyo (JP)

(72) Inventor: Kenichi Lee, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 283 days.

(21) Appl. No.: 16/610,306

(22) PCT Filed: Dec. 26, 2018

(86) PCT No.: PCT/JP2018/047803
§ 371 (c)(1),
(2) Date: Nov. 1, 2019

(87) PCT Pub. No.: WO2020/136752
PCT Pub. Date: Jul. 2, 2020

(65) Prior Publication Data
US 2021/0354833 A1 Nov. 18, 2021

(51) Int. Cl.
*B64D 17/80* (2006.01)
*B64D 47/06* (2006.01)
(Continued)

(52) U.S. Cl.
CPC ............ *B64D 17/80* (2013.01); *B64D 47/00* (2013.01); *B64D 47/02* (2013.01); *B64D 47/06* (2013.01);
(Continued)

(58) Field of Classification Search
CPC ........ B64D 17/80; B64D 47/06; B64D 47/00; B64D 47/02; B64D 25/20; B64C 2201/027; B64C 39/024
See application file for complete search history.

(56) References Cited

U.S. PATENT DOCUMENTS

2013/0093625 A1* 4/2013 Smith ................. G01S 5/06
342/387
2016/0257415 A1* 9/2016 Ye ...................... B64D 17/00
(Continued)

FOREIGN PATENT DOCUMENTS

CN 106945827 A 7/2017
CN 106945827 A * 7/2017
(Continued)

OTHER PUBLICATIONS

International Search Report for PCT/JP2018/047803 dated Apr. 2, 2019 [PCT/ISA/210] No.
(Continued)

*Primary Examiner* — Donald J Wallace
*Assistant Examiner* — Jalal C Coduroglu
(74) *Attorney, Agent, or Firm* — Sughrue Mion, PLLC

(57) ABSTRACT

An unmanned flight equipment according to an embodiment of the present invention includes: an aerial vehicle capable of flying in an unmanned manner; an abnormality recognition part-configured to recognize an abnormal situation in which a determination is made that it is difficult for the aerial vehicle to continue flight; and an alarm device held on the aerial vehicle and configured to be detached from the aerial vehicle and to warn neighborhood of abnormality when the abnormality recognition part recognizes the abnormal situation.

16 Claims, 4 Drawing Sheets

(51) Int. Cl.
  *B64D 47/02* (2006.01)
  *B64D 47/00* (2006.01)
  *B64C 39/02* (2006.01)
  *B64D 25/20* (2006.01)
  *B64U 10/13* (2023.01)

(52) U.S. Cl.
  CPC ............ *B64C 39/024* (2013.01); *B64D 25/20* (2013.01); *B64U 10/13* (2023.01)

(56) References Cited

U.S. PATENT DOCUMENTS

| | | | |
|---|---|---|---|
| 2016/0318615 A1* | 11/2016 | Pick | B64C 39/024 |
| 2016/0347462 A1* | 12/2016 | Clark | B64D 17/80 |
| 2017/0106986 A1* | 4/2017 | Sweeny | B64D 17/70 |
| 2017/0267347 A1* | 9/2017 | Rinaldi | B64C 25/58 |
| 2018/0356841 A1* | 12/2018 | Zilberstein | B64D 11/0015 |
| 2019/0009904 A1* | 1/2019 | Winkle | G08G 5/0056 |
| 2019/0315462 A1* | 10/2019 | Skladman | B64C 25/24 |
| 2020/0019190 A1* | 1/2020 | Zilberstein | B64C 39/024 |
| 2021/0009283 A1* | 1/2021 | Pawliczek | B64C 27/46 |
| 2021/0107643 A1* | 4/2021 | Nagai | B64D 47/08 |

FOREIGN PATENT DOCUMENTS

| | | | | |
|---|---|---|---|---|
| CN | 107531322 A | * | 1/2018 | ............ B64C 1/30 |
| DE | 20 2018 000 972 U1 | | 4/2018 | |
| DE | 202018000972 U1 | * | 4/2018 | |
| EP | 3891068 A1 | * | 10/2021 | |
| JP | 2017-047736 A | | 3/2017 | |
| JP | 2017047736 A | * | 3/2017 | ............ B64D 5/00 |
| JP | 2018-070013 A | | 5/2018 | |
| JP | 2018070013 A | * | 5/2018 | |
| JP | 2018-095051 A | | 6/2018 | |
| JP | 2018095051 A | * | 6/2018 | |
| KR | 102113807 B1 | * | 10/2017 | |
| KR | 101873967 B1 | * | 2/2018 | |
| WO | WO-2018002928 A1 | * | 1/2018 | ............ B64C 25/24 |

OTHER PUBLICATIONS

Written Opinion for PCT/JP2018/047803 dated Apr. 2, 2019 [PCT/ISA/237].
Notice of Reasons for Rejection issued to JP Application No. 2019-541373, dated Sep. 3, 2019.
Office Action issued in Chinese Patent Application No. 201880022627.3 dated Jun. 30, 2022.

* cited by examiner

UNMANNED FLIGHT EQUIPMENT, ALARM DEVICE, AERIAL VEHICLE, AND ALARM DEVICE RELEASE APPARATUS

CROSS REFERENCE TO RELATED APPLICATIONS

This application is a National Stage of International Application No. PCT/JP2018/047803 filed Dec. 26, 2018.

TECHNICAL FIELD

The present invention relates to an unmanned flight equipment, an alarm device, an aerial vehicle, and an alarm device release apparatus.

BACKGROUND ART

Aerial vehicles (including airships and the like) such as drones (unmanned rotorcrafts) have been put to various uses. It is also under consideration to use the aerial vehicles to deliver goods. In order to reduce damage that can be caused when a drone crashes due to some kind of abnormality occurring during flight, studies have been made on techniques of raising an alarm device to persons in the place where the drone is going to crash.

For example, Patent Document 1 cited below discloses a drone provided, on the lower surface of its casing, with an alarm device including a red-light emitting diode and an alarm device sound emitter. The drone causes the alarm device to warn persons below the drone when various kinds of abnormal situations occur.

Patent Document 1: Japanese Unexamined Patent Application, Publication No. 2017-47736

DISCLOSURE OF THE INVENTION

Problems to be Solved by the Invention

With the configuration disclosed in the above publication, it is impossible to reliably make persons on the ground recognize the warning unless a sufficiently strong light or a sufficiently loud alarm device sound is emitted when the drone is at a high altitude. For this reason, the persons on the ground may notice the falling drone only after the drone descends to a low altitude.

In view of the foregoing background, it is therefore an object of the present invention to provide an unmanned flight equipment, an alarm device, an aerial vehicle, and an alarm device release apparatus that are capable of quickly warning persons below the aerial vehicle of abnormality when the aerial vehicle is in an abnormal situation.

Means for Solving the Problems

An unmanned flight equipment according to an embodiment of the present invention includes: an aerial vehicle capable of flying in an unmanned manner; an abnormality recognition part configured to recognize an abnormal situation in which a determination is made that it is difficult for the aerial vehicle to continue flight; and an alarm device held on the aerial vehicle and configured to be detached from the aerial vehicle and to warn neighborhood of abnormality when the abnormality recognition part recognizes the abnormal situation.

An alarm device according to another embodiment of the present invention is configured to be held on an aerial vehicle that is capable of flying in an unmanned manner. The alarm device includes an abnormality recognition part configured to recognize an abnormal situation in which a determination is made that it is difficult for the aerial vehicle to continue flight, wherein when the abnormality recognition part recognizes the abnormal situation, the alarm device is detached from the aerial vehicle and warns neighborhood of abnormality.

An aerial vehicle of yet another embodiment is capable of flying in an unmanned manner, and includes: an abnormality recognition part configured to recognize an abnormal situation in which a determination is made that it is difficult to continue flight; and an alarm device release apparatus configured to release an alarm device when the abnormality recognition part recognizes the abnormal situation, the alarm device warning neighborhood of abnormality.

An alarm device release apparatus of still another embodiment of the present invention is mountable to an aerial vehicle that is capable of flying in an unmanned manner. The alarm device release apparatus includes an abnormality recognition part configured to recognize an abnormal situation in which a determination is made that it is difficult to continue flight, wherein when the abnormality recognition part recognizes the abnormal situation, the alarm device release apparatus releases an alarm device that warns neighborhood of abnormality.

Effects of the Invention

The present invention provides an unmanned flight equipment, an alarm device, an aerial vehicle, and an alarm device release apparatus that can quickly warn persons below the unmanned flight equipment of abnormality when the aerial vehicle is in an abnormal situation.

PREFERRED MODE FOR CARRYING OUT THE INVENTION

Non-limiting exemplary embodiments of the present invention will be described below with reference to the drawings.

Figure 1:
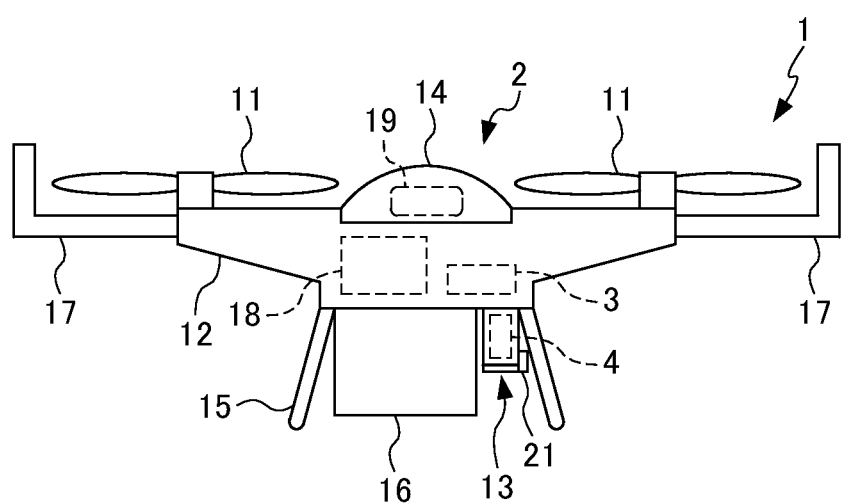
FIG. 1 is a schematic side view showing a configuration of an unmanned flight equipment according to an embodiment of the present invention.
Figure 2:
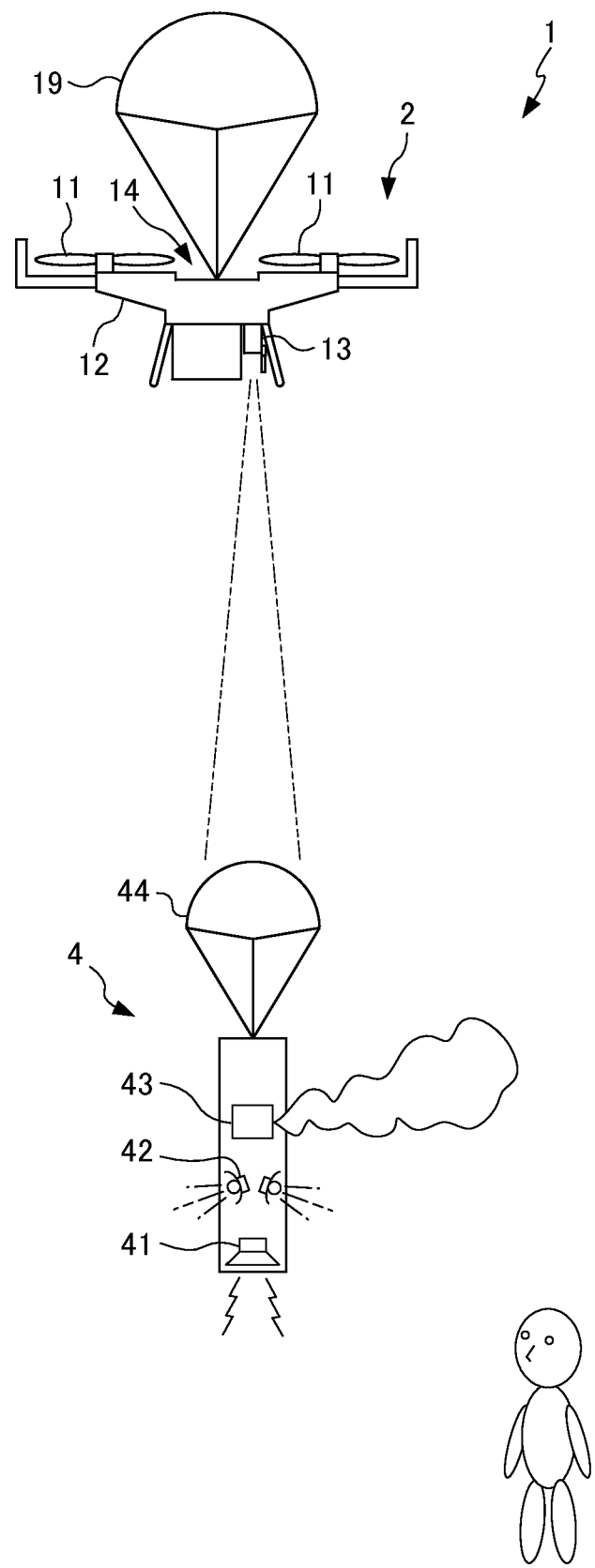
FIG. 2 is a schematic diagram showing the unmanned flight equipment of FIG. 1, when warning of abnormality.
Figure 3:
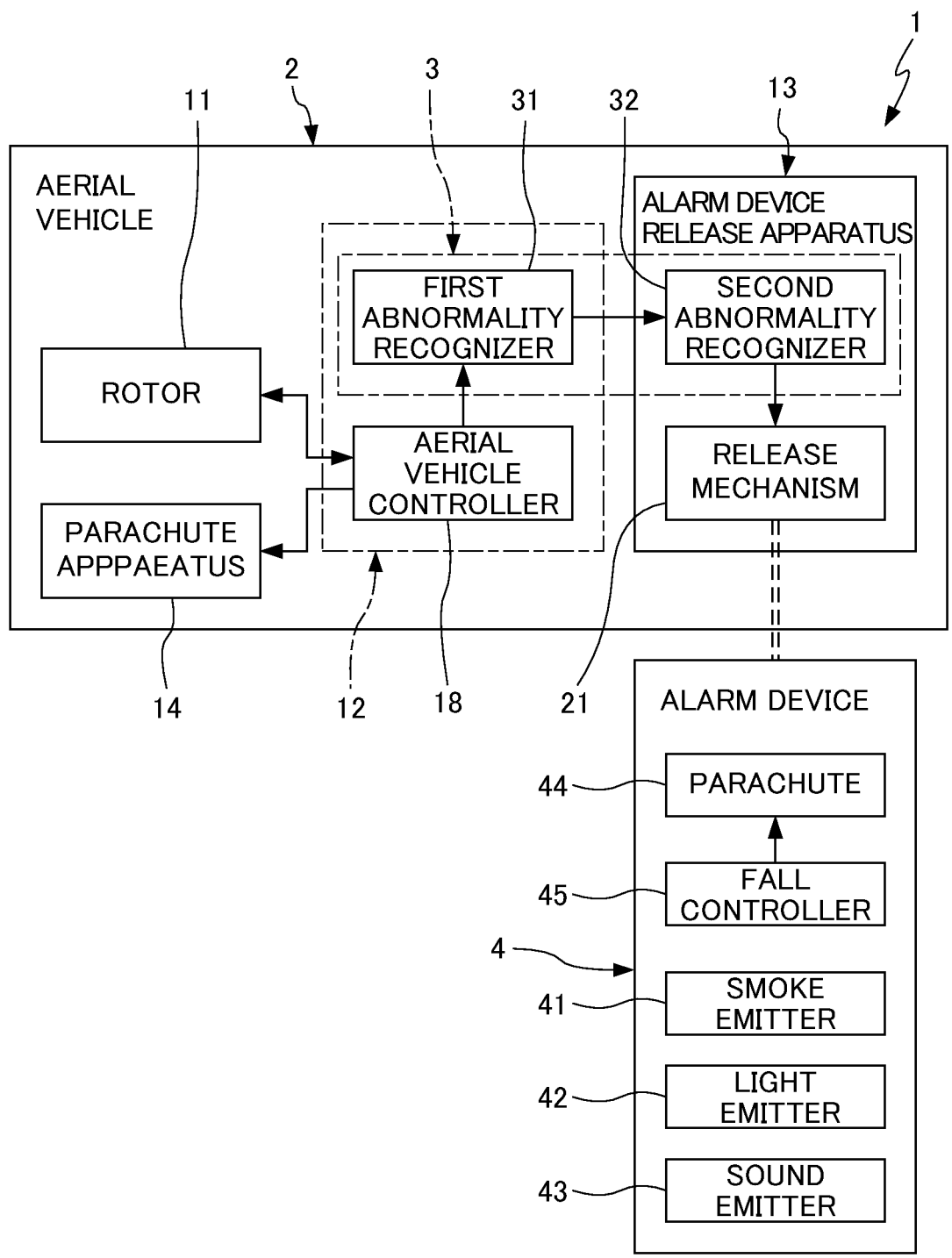
FIG. 3 is a block diagram showing the configuration of the unmanned flight equipment of FIG. 1.

FIG. 1 is a schematic side view showing a configuration of an unmanned flight equipment 1 according to an embodiment of the present invention. FIG. 2 is a schematic diagram showing the unmanned flight equipment 1 of FIG. 1, when warning of abnormality. FIG. 3 is a block diagram showing the configuration of the unmanned flight equipment 1 shown in FIG. 1.

The unmanned flight equipment 1 includes: an aerial vehicle 2 capable of flying in an unmanned manner; an abnormality recognition part 3 provided in the aerial vehicle 2 and configured to recognize an abnormal situation in which a determination is made that it is difficult for the aerial vehicle 2 to continue the flight; and an alarm device 4 held on the aerial vehicle 2 and configured to be detached from the aerial vehicle 2 and to warn neighborhood of the abnormality when the abnormality recognition part 3 recognizes the abnormality, as shown in FIG. 2. It should be noted that "capable of flying in an unmanned manner" refers to an aerial vehicle that can fly without any person on board the aerial vehicle, and encompasses not only an aerial vehicle capable of autonomous flight, but also an aerial vehicle remotely controlled by a person.

The aerial vehicle 2 is per se an aerial vehicle according to an embodiment of the present invention. The aerial vehicle 2 of the present embodiment is an unmanned rotorcraft (drone) including a plurality of rotors 11.

The aerial vehicle 2 includes a body 12 holding thereon the plurality of rotors 11 and an alarm device release apparatus 13 mounted on the body 12. The aerial vehicle 2 preferably includes a parachute apparatus 14 attached to the body 12. In addition, the aerial vehicle 2 may further include: legs 15 arranged on a lower portion of the body 12 and supporting the body 12 at the time of landing; a box 16 configured to accommodate a load to be delivered; and protective members 17 mounted on the body 12 and preventing the rotors 11 from directly colliding with a person, a building, a tree, etc.

The plurality of rotors 11 are held on the body 12 and rotate to generate lift for the unmanned flight equipment 1 to fly. The rotors 11 can be arranged on an upper surface of the body 12 so that they can rotate without interfering with the body 12. It is preferable that in a planar view, the rotors 11 are held equidistantly from the center of the body 12 and are evenly spaced apart from each other such that their axes of rotation are vertical (and their surfaces of revolution are horizontal).

While holding the plurality of rotors 11, the body 12 is able to house: a battery (power source) for driving the rotors 11 and other components; an electronic device (e.g., a computer including a CPU, memory, etc. and executing control programs) constituting an aerial vehicle controller 18 for controlling the flight and the like of the aerial vehicle 2; and the abnormality recognition part 3.

The alarm device release apparatus 13 may be integral with, and inseparable from, the body 12. Alternatively, the alarm device release apparatus 13 may be configured by attaching a separate alarm device release apparatus according to one embodiment of the present invention to the aerial vehicle 2 (e.g., the leg 15). Thus, the following description of the alarm device release apparatus 13 can be considered to be the same as the description of the alarm device release apparatus according to one embodiment of the present invention.

The alarm device release apparatus 13 has a release mechanism 21 that holds the alarm device 4, and releases the alarm device 4 when the abnormality recognition part 3 recognizes an abnormal situation in which a determination is made that it is difficult for the aerial vehicle 2 to continue the flight. When an abnormal situation occurs in which the aerial vehicle 2 is expected to crash or make an emergency landing, this feature makes it possible to make persons below the aerial vehicle 2 be aware of the descent of the aerial vehicle 2.

The release mechanism 21 may include a container which, for example, houses the alarm device 4, and of which a lower wall is opened in response to actuation of an actuator so as to release the alarm device 4 when the abnormality recognition part 3 recognizes the abnormal situation. Alternatively, the release mechanism 21 may have an arm that grips the alarm device 4 in an exposed state and is actuated by an actuator to release the alarm device 4 when the abnormality recognition part 3 recognizes the abnormal situation.

When the abnormality recognition part 3 recognizes the abnormal situation, the alarm device release apparatus 13 may wait for the aerial vehicle 2 to descend to a predetermined altitude before releasing the alarm device 4. In this manner, a horizontal deviation between a position at which the alarm device 4 warns of the abnormality and a position at which the aerial vehicle 2 falls or lands on the ground can also be reduced.

The parachute apparatus 14 has a parachute 19 that is deployed when the aerial vehicle 2 is falling, so that the falling speed of the aerial vehicle 2 is reduced. The parachute apparatus 14 deploys the parachute 19 to reduce the falling speed of the aerial vehicle 2, thereby lengthening the time from the moment at which the alarm device 4 warns of the abnormality to the moment when the aerial vehicle 2 falls or lands on the ground. As a result, persons who have been warned of the abnormality of the aerial vehicle 2 by the alarm device 4 can evacuate with sufficient lead time before the aerial vehicle 2 falls on the ground. It should be noted that "when the aerial vehicle is falling" refers to a state in which the aerial vehicle 2 is falling without being controlled, and is intended to exclude cases such as where the aerial vehicle 2 descends in altitude to make an emergency landing under control when, for example, the remaining battery level becomes low.

It is preferable that the parachute apparatus 14 deploys the parachute 19 at an altitude which allows the alarm device 4 to descend prior to the aerial vehicle 2 to an altitude at which the alarm device 4 can be recognized by neighborhood. Deploying the parachute 19 after the aerial vehicle 2 has descended to a certain altitude also makes it possible to reduce a horizontal deviation between a position at which the alarm device 4 warns of the abnormality and a position at which the aerial vehicle 2 falls or lands on the ground. The parachute 19 may be deployed before or after the alarm device release apparatus 13 releases the alarm device 4.

The abnormality recognition part 3 may be an independent device attached to the aerial vehicle 2 or may be integral with a control apparatus for controlling the flight of the aerial vehicle 2. The abnormality recognition part 3 may be configured to recognize an abnormal situation by receiving a signal indicating the abnormal situation from the aerial vehicle controller 18. As shown in FIG. 3, the unmanned flight equipment 1 includes: a first abnormality recognizer 31 provided integrally with the aerial vehicle controller 18; and a second abnormality recognizer 32 provided in the alarm device release apparatus 13. The first abnormality recognizer 31 can be realized by, for example, part of programs of the computer constituting the aerial vehicle controller 18, and may serve also as a fall detection function of a conventional drone. The second abnormality recognizer 32 may be configured as, for example, an interface that receives a signal from the first abnormality recognizer 31. Specifically, the first abnormality recognizer 31 determines whether or not an abnormal situation has occurred, and the second abnormality recognizer 32 recognizes the abnormal situation by receiving a signal indicating the determination result from the first abnormality recognizer 31.

The abnormality recognition part 3 may be configured to recognize an abnormal situation by receiving, directly or via the aerial vehicle controller 18, a signal sent by a user when the user determines that it is difficult for the aerial vehicle 2 to continue the flight, the signal being sent through operation of a device or the like for remotely operating the unmanned flight equipment 1.

The abnormal situation recognized by the abnormality recognition part 3 may include, in addition to failures of the aerial vehicle 2, a situation in which stable flight is impossible due to a strong wind or other factors, a situation in which the remaining battery level is low as a result of a long time of flight, and other adverse situations.

To determine whether or not an abnormal situation has occurred, the abnormality recognition part 3 (first abnormality recognizer 31) may be configured to determine whether or not it is difficult for the aerial vehicle 2 to continue the flight by, for example, acquiring information such as a value of current of the rotors 11, an acceleration of the aerial vehicle 2, a remaining battery level, and the like from the aerial vehicle controller 18. Alternatively, the abnormality recognition part 3 may acquire a detected value (receive an output signal) from a sensor (not shown; e.g., an acceleration sensor, a gyro sensor, etc.) provided to the aerial vehicle 2 so as to determine whether or not an abnormal situation has occurred. For example, a situation in which stable flight is not possible due to a strong wind or other factors can be determined based on information about the wind velocity obtained from a wind velocity sensor, or based on a result of attitude estimation of the aerial vehicle obtained using an acceleration sensor or a gyro sensor.

The alarm device 4 preferably includes at least one of a sound emitter 41, a light emitter 42, or a smoke emitter 43 in order to warn neighborhood, in particular persons below the aerial vehicle 2, of abnormality. In other words, the alarm device 4 preferably emits sound, light, and/or smoke to warn neighborhood of an abnormal situation of the aerial vehicle 2. Use of such means makes the neighborhood recognize the possibility that the aerial vehicle 2 is falling or landing and urges them to evacuate, thereby enabling reduction of damage that can be caused by the aerial vehicle 2 crashing or urgently landing.

Preferably, the alarm device 4 further includes a parachute 44 and a fall controller 45 that controls the deployment of the parachute 44.

The sound emitter 41 may have, for example, a buzzer or a speaker for electrically generating sound, a whistle for generating sound by using a flow of air or gas, or a cracker for generating sound by causing an explosion. If the sound emitter 41 has a speaker, it may emit an inhuman warning sound or a voice message to warn neighborhood. If the sound emitter 41 is configured to generate sound using a whistle, a relative airflow due to the descent of the alarm device 4 may be used. Alternatively, a gas cylinder or the like may be incorporated in the alarm device 4 to form a gas flow for sounding the whistle.

The light emitter 42 may have, for example, an LED, a light bulb, an electric flash, a flashbulb, a chemical lamp, a burner for igniting flame, and the like. The light emitter 42 may blink to improve visibility.

The smoke emitter 43 may have a smoke candle or the like. Alternatively, a flame igniter or the like that also serves as the light emitter 42 may be used as the smoke emitter 43.

It is preferable that the sound emitter 41 and the light emitter 42 emit sound and light downward so that the alarm device 4 can efficiently warn persons below the alarm device 4 (persons on the ground) of abnormality.

The parachute 44 causes the alarm device 4 to stay in the air for a long time, thereby making it easier for neighborhood to notice the alarm device 4. In addition, the parachute 44 can soften the impact at the time of landing by reducing the final falling speed of the alarm device 4.

The fall controller 45 preferably deploys the parachute 44 at a predetermined altitude. While the altitude of the alarm device 4 is high and it is difficult for persons on the ground to notice the alarm device 4, the fall controller 45 allows the alarm device 4 to descend faster than the aerial vehicle 2 by not deploying the parachute 44. Then, when the alarm device 4 reaches such a low altitude that persons on the ground can easily notice the alarm device 4, the fall controller 45 deploys the parachute 44 to reduce the falling speed of the alarm device 4. Thus, the fall controller 45 deploys the parachute 44 only when the alarm device 4 descends to reach a certain altitude (close to the ground), thereby causing the alarm device 4 to descend prior to the aerial vehicle 2 to an altitude at which the alarm device 4 can be easily noticed by the neighborhood. This feature also makes it possible to shorten the time from the moment when the alarm device 4 is released to the moment when the alarm device 4 reaches an altitude at which the alarm device 4 is easily noticed by the neighborhood.

The fall controller 45 may have an altimeter and deploy the parachute 44 at a predetermined altitude. The fall controller 45 may acquire, from the aerial vehicle 2, an altitude at which the alarm device 4 is detached from the aerial vehicle 2 (at which the alarm device release apparatus 13 releases the alarm device 4) and may deploy the parachute 44 when a period of time, which the alarm device 4 is expected to take to reach the predetermined altitude, elapses. This feature enables the parachute 44 to be deployed at an appropriate timing, while simplifying the configuration of the fall controller 45. Further, it is easy to provide the aerial vehicle 2 with a system capable of measuring the altitude relatively accurately. With such a system, the altitude of the aerial vehicle 2 can be measured relatively accurately, in particular while the flight is stable until an abnormal situation is recognized. Thus, acquiring from the aerial vehicle 2 the altitude at which the alarm device 4 is detached from the aerial vehicle 2 enables relatively accurate adjustment of the altitude at which the parachute 44 is deployed.

The fall controller 45 may acquire a period of time until the moment of deployment of the parachute 44 of the alarm device 4, the period of time being calculated by the aerial vehicle 2 based on information of its own altitude, and may deploy the parachute 44 when the acquired period of time elapses. In the case where the alarm device 4 is detached from the aerial vehicle 2 at a fixed altitude, the fall controller 45 may deploy the parachute 44 when a preset period of time, i.e., a period of time that the alarm device 4 is expected to take from its detachment from the aerial vehicle 2 to arrival at a predetermined altitude elapses. Examples of the case in which the alarm device 4 is detached from the aerial vehicle 2 at the fixed altitude include where the alarm device 4 is released when the aerial vehicle 2 descends to the fixed altitude, and where the altitude at which the alarm device 4 is released is considered to be substantially fixed because the aerial vehicle 2 constantly flies at a fixed altitude.

In the case where the parachute 19 is deployed when the aerial vehicle 2 descends to a fixed altitude, the altitude at which the fall controller 45 deploys the parachute 44 is preferably set lower than the altitude at which the aerial vehicle 2 deploys the parachute 19. This feature ensures that the alarm device 4 warns of abnormality at a position lower than the aerial vehicle 2.

Further, the alarm device 4 may have a shape with a small air resistance, such as a cylindrical shape, a rod shape, a streamlined shape, or the like, so that the falling speed of the alarm device 4 is increased until the parachute 44 is deployed and the alarm device 4 can quickly reach an altitude at which the alarm device 4 can warn persons on the ground of abnormality. In order to soften the impact occurring at the time of landing of the alarm device 4, the outer side of the alarm device 4 may be covered with an elastic cushioning material such as sponge.

As described above, the unmanned flight equipment 1 includes the aerial vehicle 2, the abnormality recognition part 3, and the alarm device 4, so that when an abnormal situation in which the aerial vehicle 2 cannot continue the flight occurs, the alarm device 4 is detached to promptly warn the persons below the unmanned flight equipment 1 of the abnormality. This feature makes it possible to urge persons who are at a location where the aerial vehicle 2 will fall or land to evacuate, thereby enabling reduction of damage.

It has been known to provide an aerial vehicle with a warning mechanism that emits sound or light in order to warn persons on the ground of an abnormal situation. However, making the sound or light of the warning mechanism perceptible by persons on the ground while the aerial vehicle is still at a high altitude requires an increase in the output of the warning mechanism. Such an increase in the output results in an increase in the weight of the aerial vehicle and significantly limits the payload of the aerial vehicle. In contrast, the unmanned flight equipment 1, which employs the alarm device 4 that is detached from the aerial vehicle 2 and descends prior to the aerial vehicle 2, can make persons on the ground notice an abnormal situation while the aerial vehicle 2 is still at a high altitude, and allows the persons to have enough time to evacuate, while reducing an increase in the weight of the unmanned flight equipment 1. In the case of providing an aerial vehicle with a warning mechanism that emits sound or light, it is also possible to give persons on the ground enough time to evacuate by reducing the falling speed of the aerial vehicle by means of a large parachute provided to the aerial vehicle. However, such an increase in the size of the parachute also results in an increase in the weight of the aerial vehicle. Further, such a large parachute occupies space inside the aerial vehicle to significantly limit the payload of the aerial vehicle. On the other hand, the unmanned flight equipment 1, which can warn of an abnormal situation by releasing a relatively small and light alarm device 4, is capable of carrying a comparatively heavy load or a load having a large volume.

In addition, the unmanned flight equipment 1, which includes the aerial vehicle 2, the first abnormality recognizer 31, and the alarm device release apparatus 13, releases the alarm device 4 when an abnormal situation in which the aerial vehicle 2 cannot continue the flight occurs, thereby warning persons below the unmanned flight equipment 1 of the abnormality, and enabling reduction of damage.

In addition, the alarm device release apparatus 13, which includes the second abnormality recognizer 32 and the release mechanism 21, releases the alarm device 4 when an abnormal situation in which the aerial vehicle 2 cannot continue the flight occurs, so as to promptly warn persons below the unmanned flight equipment of the abnormality.

Figure 4:
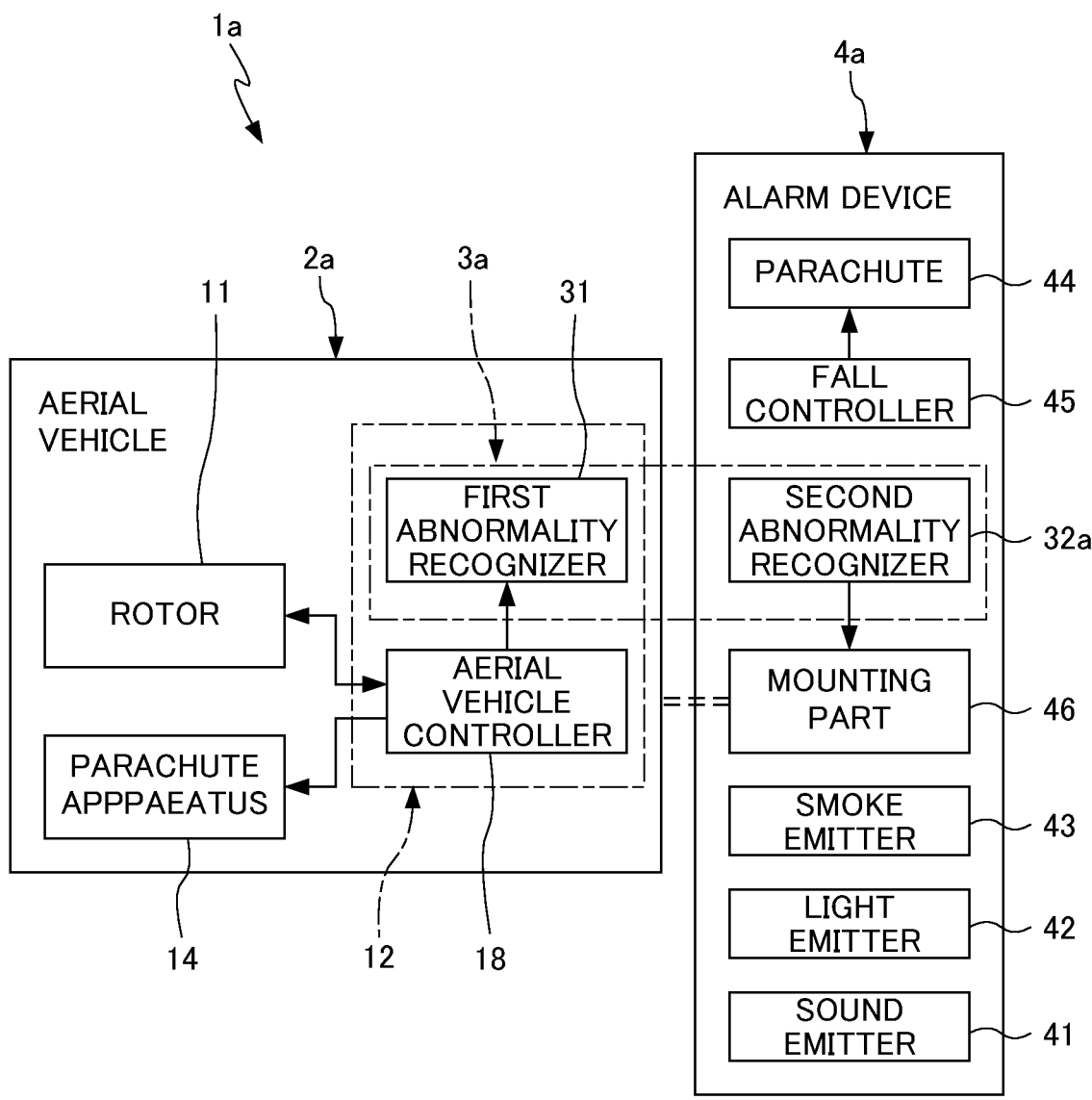
FIG. 4 is a block diagram showing a configuration of an unmanned flight equipment according to an embodiment different from that shown in FIG. 3.

FIG. 4 is a block diagram showing a configuration of an unmanned flight equipment 1a according to another embodiment of the present invention. In the following description, the same components as those described above are denoted by the same reference characters, and a repetitive description thereof is omitted.

The unmanned flight equipment 1a includes: an aerial vehicle 2a capable of flying in an unmanned manner; an abnormality recognition part 3a provided in the aerial vehicle 2a and configured to recognize an abnormal situation in which a determination is made that it is difficult for the aerial vehicle 2a to continue the flight; and an alarm device 4a held on the aerial vehicle 2a and configured to be detached from the aerial vehicle 2a and to warn neighborhood of abnormality when the abnormality recognition part 3a recognizes abnormality. The alarm device 4a of the unmanned flight equipment 1a is per se an embodiment of the alarm device according to the present invention.

The aerial vehicle 2a includes: a body 12 holding thereon a plurality of rotors 11 and having an aerial vehicle controller 18; a parachute apparatus 14 attached to the body 12; legs 15 arranged on a lower portion of the body 12 and supporting the body 12 at the time of landing; a box 16 configured to accommodate a load to be delivered; and protective members 17 mounted on the body 12 and preventing the rotors 11 from directly colliding with a person, a building, a tree, etc.

The abnormality recognition part 3a includes: a first abnormality recognizer 31 provided in the body 12 of the aerial vehicle 2a; and a second abnormality recognizer 32a provided in the alarm device 4a. The first abnormality recognizer 31 determines, based on information acquired from the aerial vehicle controller 18 or the like, whether an abnormal situation in which a determination is made that it is difficult for the aerial vehicle 2a to continue the flight has occurred. The second abnormality recognizer 32a recognizes the abnormal situation by receiving a signal indicating the determination result from the first abnormality recognizer 31.

The alarm device 4a has a sound emitter 41, a light emitter 42, a smoke emitter 43, a parachute 44, a fall controller 45, and a mounting part 46 attachable to the aerial vehicle 2a.

The mounting part 46 is configured to be detached from the aerial vehicle 2a when the second abnormality recognizer 32a recognizes an abnormal situation. The mounting part 46 may include a movable arm for gripping the leg 15 or the like of the aerial vehicle 2a, or may include a band-like member to be wound around the leg 15 or the like of the aerial vehicle 2a, and a mechanism for cutting the band-like member or releasing one end of the band-like member.

In the unmanned flight equipment 1a of the present embodiment, the alarm device having the second abnormality recognizer 32a and the mounting part 46 is mounted on the aerial vehicle 2a. In other words, the mechanical structure of the aerial vehicle 2a of the unmanned flight equipment 1a of the present embodiment is the same as that of a conventional aerial vehicle (drone). Conventional drones are often provided with a configuration for making determination in a manner similar to that of the first abnormality recognizer 31. Thus, the unmanned flight equipment 1a of the present embodiment can be realized relatively easily by mounting (mechanically connecting) the alarm device 4a to an existing drone and electrically connecting the alarm device 4a so that a signal from the first abnormality recognizer 31 can be received.

Also in the unmanned flight equipment 1a of the present embodiment, when an abnormal situation in which the aerial vehicle 2a cannot continue the flight occurs, the alarm device 4a is detached so that persons below the unmanned flight equipment 1a can be promptly warned of the abnormality, and urged to evacuate.

In addition, when an abnormal situation in which the aerial vehicle 2a cannot continue the flight has occurred, the alarm device 4a is detached from the aerial vehicle 2a to promptly warn persons below the aerial vehicle 2a of the abnormality, thereby contributing to reduction of the damage that can be caused by the fall or the urgent landing of the aerial vehicle 2a.

The two embodiments of the present invention have been described above. However, the present invention is not limited to the above-described embodiments, but encompasses variations, improvements, and the like within the scope capable of achieving the object of the present invention.

In an unmanned flight equipment according to an embodiment of the present invention, the aerial vehicle is not limited to an unmanned rotorcraft, but may be, for example, an unmanned airplane, an unmanned airship, or the like.

In an unmanned flight equipment according to an embodiment of the present invention, the unmanned flight equipment and the alarm device release apparatus may include an ejection mechanism for ejecting the alarm device downward. The ejection mechanism can be configured as, for example, a mechanism that ejects the alarm device by using an actuator, a spring, rubber, etc. The ejection mechanism can cause the alarm device to descend more quickly to an altitude at which an abnormality can be warned of, and consequently, persons below the unmanned flight equipment can have enough time to evacuate.

In an unmanned flight equipment according to an embodiment of the present invention, the aerial vehicle does not have to have the parachute. The aerial vehicle has relatively high air resistance. In addition, it is presumed that the aerial vehicle has enough time from a moment when the abnormality recognition part recognizes an abnormal situation to a moment when the aerial vehicle completely loses the lift. For these reasons, even if the aerial vehicle does not have the parachute, the alarm device descends prior to the aerial vehicle. Further, the alarm device does not have to have the parachute and the fall controller. In particular, if the light or the sound emitted by the alarm device is strong, it is possible to issue warning, with sufficient lead time, to persons below the unmanned flight equipment, even without gaining time by the parachute.

In an unmanned flight equipment according to an embodiment of the present invention, the alarm device may warn of an abnormality by means other than sound, light, and smoke. For example, the alarm device may hang a banner bearing thereon words or phrase warning the fall of the aerial vehicle, simultaneously with the deployment of the parachute.

An alarm device according to an embodiment of the present invention may include an abnormal situation recognition part that has various sensors and is capable of determining by itself an abnormal situation of the aerial vehicle. With thus configured alarm device, the unmanned flight equipment according to the present invention can be achieved without modifying an existing aerial vehicle.

As is apparent from the above description, the present invention achieves advantageous effects thanks to the following configurations.

An unmanned flight equipment (e.g., the unmanned flight equipment 1, 1a) according to an embodiment of the present invention includes: an aerial vehicle (e.g., the aerial vehicle 2, 2a) capable of flying in an unmanned manner, an abnormality recognition part (e.g., the abnormality recognition part 3, 3a) configured to recognize an abnormal situation in which a determination is made that it is difficult for the aerial vehicle to continue the flight; and an alarm device (e.g., the alarm device 4, 4a) held on the aerial vehicle and configured to be detached from the aerial vehicle and to warn neighborhood of abnormality when the abnormality recognition part recognizes the abnormal situation. With this feature, in the abnormal situation in which a determination is made that it is difficult for the aerial vehicle to continue the flight, the unmanned flight equipment detaches the alarm device so that persons in the vicinity of a location where the aerial vehicle will fall or land are warned in advance of the abnormality and urged to evacuate, thereby enabling prevention of serious damage.

In an unmanned flight equipment according to an embodiment of the present invention, the alarm device may include a parachute (e.g., the parachute 44). This feature allows the alarm device to stay in the air for a longer period of time, so that the neighborhood can be reliably made to recognize abnormality.

In an unmanned flight equipment according to an embodiment of the present invention, the alarm device may further include a fall controller (e.g., the fall controller 45) configured to deploy the parachute at a predetermined altitude. With this feature, the alarm device descends to be close to the ground prior to the aerial vehicle, and then deploys the parachute to stay in the air, making it possible to make the neighborhood recognize abnormality further promptly.

In an unmanned flight equipment according to an embodiment of the present invention, the fall controller may acquire the altitude at which the alarm device is detached from the aerial vehicle. With this feature, the alarm device no longer has to have an altimeter or the like, thereby enabling simplification of the configuration of the alarm device. The aerial vehicle can relatively accurately measure the altitude at the moment when the abnormal situation has been recognized, thereby making it possible to control the altitude at which the alarm device deploys the parachute relatively accurately.

In an unmanned flight equipment according to an embodiment of the present invention, the alarm device may further include a fall controller (e.g., the fall controller 45) that is configured to deploy the parachute when a predetermined period of time elapses from the moment of detachment of the alarm device from the aerial vehicle. In the case where the aerial vehicle flies at a fixed altitude, the parachute can be deployed at a substantially fixed altitude also by deploying the parachute in this manner, i.e., when the predetermined period of time elapses from the detachment from the aerial vehicle. Thus, the configuration of the alarm device can be simplified substantially without impairing the function.

In an unmanned flight equipment according to an embodiment of the present invention, the alarm device may emit sound, light, and/or smoke. This feature allows neighborhood to recognize the alarm device relatively easily.

In an unmanned flight equipment according to an embodiment of the present invention, the aerial vehicle may further include a parachute (e.g., the parachute 19) which is deployed when the aerial vehicle is falling. This feature makes it possible to reduce the falling speed of the aerial vehicle, and to secure enough time from a moment when the alarm device warns of the fall of the aerial vehicle to a moment when the aerial vehicle actually falls on the ground.

An alarm device (e.g., the alarm device 4a) according to an embodiment of the present invention is configured to be held on an aerial vehicle (e.g., the aerial vehicle 2a) that is capable of flying in an unmanned manner. The alarm device includes an abnormality recognition part (e.g., the second abnormality recognizer 32a) configured to recognize an abnormal situation in which a determination is made that it is difficult for the aerial vehicle to continue the flight. When the abnormality recognition part recognizes the abnormal situation, the alarm device is detached from the aerial vehicle and warns neighborhood of the abnormality. Thus, in the abnormal situation in which a determination is made that it is difficult for the aerial vehicle to continue the flight, the alarm device is detached from the aerial vehicle, so that persons in the vicinity of a location where the aerial vehicle will fall or land are warned in advance of the abnormality and urged to evacuate, thereby enabling prevention of serious damage.

An alarm device according to an embodiment of the present invention may further include a mounting part (e.g., the mounting part 46) that is attachable to, and detachable from, the aerial vehicle. The mounting part may be detached from the aerial vehicle when the abnormality recognition part recognizes the abnormal situation. This feature makes it easy to attach the alarm device to an existing aerial vehicle.

An aerial vehicle (e.g., the aerial vehicle 2) according to an embodiment of the present invention is capable of flying in an unmanned manner and includes: an abnormality recognition part (e.g., the abnormality recognition part 3) configured to recognize an abnormal situation in which a determination is made that it is difficult to continue the flight; and an alarm device release apparatus (e.g., the alarm device release apparatus 13) configured to release an alarm device (e.g., the alarm device 4) when the abnormality recognition part recognizes the abnormal situation, the alarm device warning neighborhood of abnormality. With this feature, in the abnormal situation in which a determination is made that it is difficult for the aerial vehicle to continue the flight, the unmanned flight equipment causes the alarm device release apparatus to release the alarm device, so that persons in the vicinity of a location where the aerial vehicle will fall or land are warned in advance of abnormality and urged to evacuate, thereby enabling prevention of serious damage.

An alarm device release apparatus (e.g., the alarm device release apparatus 13) according to an embodiment of the present invention is mountable to an aerial vehicle (e.g., the aerial vehicle 2) that is capable of flying in an unmanned manner. The alarm device release apparatus includes an abnormality recognition part (e.g., the second abnormality recognizer 32) configured to recognize an abnormal situation in which a determination is made that it is difficult for the aerial vehicle to continue the flight. When the abnormality recognition part recognizes the abnormal situation, the alarm device release apparatus releases an alarm device (e.g., the alarm device 4) that warns neighborhood of abnormality. By attaching this alarm device release apparatus to an aerial vehicle, an unmanned flight equipment can be obtained, the unmanned flight equipment being capable of preventing serious damage by warning in advance persons, who are in the vicinity of a location where the aerial vehicle will fall or land, of abnormality by means of the alarm device in the abnormal situation in which a determination is made that it is difficult for the aerial vehicle to continue the flight.

EXPLANATION OF REFERENCE NUMERALS

1, 1*a* . . . Unmanned Flight equipment, 2, 2*a* . . . Aerial Vehicle, 3, 3*a* . . . Abnormality Recognition Part, 4, 4*a* . . . Alarm device, 11 . . . Rotor, 12 . . . Body, 13 . . . Alarm device Release Apparatus, 14 . . . Parachute Apparatus, 15 . . . Leg, 16 . . . Box, 17 . . . Protective Member, 18 . . . Aerial Vehicle Controller, 19 . . . Parachute, 21 . . . Release Mechanism, 31 . . . First Abnormality Recognizer, 32, 32*a* . . . Second Abnormality Recognizer, 41 . . . Sound Emitter, 42 . . . Light Emitter, 43 . . . Smoke Emitter, 44 . . . Parachute, 45 . . . Fall Controller, 46 . . . Mounting Part

The invention claimed is:

1. An unmanned flight equipment comprising:
   an aerial vehicle capable of flying in an unmanned manner, the aerial vehicle comprising a body and legs disposed on a lower portion of the body and configured to support the body at a time of landing, wherein the body is configured to accommodate a battery, and an aerial vehicle controller configured to control an unmanned flight of the aerial vehicle that is powered by the battery;
   an abnormality recognition part configured to, during the unmanned flight of the aerial vehicle, receive a signal from the aerial vehicle controller of the aerial vehicle, and recognize, from the received signal, an abnormal situation in which a determination is made that it is difficult for the aerial vehicle to continue the unmanned flight; and
   an alarm device disposed on the lower portion of the body of the aerial vehicle and adjacent to the legs of the aerial vehicle, the alarm device being configured to be, based on recognition of the abnormal situation by the abnormality recognition part during the unmanned flight of the aerial vehicle, detached from the aerial vehicle, the alarm device being configured to, based on being detached from the aerial vehicle, descend prior to the aerial vehicle, and activate an alarm mechanism to output warning of abnormality to a neighborhood.

2. The unmanned flight equipment according to claim 1, wherein
   the alarm device includes a parachute.

3. The unmanned flight equipment according to claim 2, wherein
   the alarm device further includes a fall controller that is configured to deploy the parachute at a predetermined altitude.

4. The unmanned flight equipment according to claim 3, wherein
   the fall controller is configured to acquire an altitude at which the alarm device is detached from the aerial vehicle.

5. The unmanned flight equipment according to claim 2, wherein
   the alarm device further includes a fall controller that is configured to deploy the parachute when a predetermined period of time elapses from a moment of detachment of the alarm device from the aerial vehicle.

6. The unmanned flight equipment according to claim 1, wherein
   the alarm device is configured to emit sound, light, and/or smoke.

7. The unmanned flight equipment according to claim 1, wherein
   the aerial vehicle further includes a parachute to be deployed when the aerial vehicle is falling.

8. The unmanned flight equipment according to claim 1, wherein the abnormality recognition part is configured to receive the signal from an external device, which is used for remotely operating the unmanned flight equipment.

9. The unmanned flight equipment according to claim 1, wherein the abnormality recognition part is configured to receive the signal from the aerial vehicle controller, the signal including information of a remaining battery level of the aerial vehicle.

10. The unmanned flight equipment according to claim 9, wherein the abnormality recognition part is configured to recognize the abnormal situation based on a battery level being lower than a battery level required for making an emergency landing of the aerial vehicle.

11. The unmanned flight equipment according to claim 1, wherein the abnormality recognition part comprises a first abnormality recognizer provided in the body of the aerial vehicle and a second abnormality recognizer provided in the alarm device, and
 wherein the alarm device is configured to be detached from the aerial vehicle based on the second abnormality recognizer recognizing the abnormal situation by receiving a signal indicating a determination that the abnormal situation has occurred from the first abnormality recognizer.

12. An alarm device configured to be held on an aerial vehicle that is capable of flying in an unmanned manner, the aerial vehicle comprising a body and legs disposed on a lower portion of the body and configured to support the body at a time of landing, wherein the body is configured to accommodate a battery, and an aerial vehicle controller configured to control an unmanned flight of the aerial vehicle that is powered by the battery,
 the alarm device comprising an abnormality recognition part configured to, during the unmanned flight of the aerial vehicle, receive a signal from the aerial vehicle, and recognize, from the received signal, an abnormal situation in which a determination is made that it is difficult for the aerial vehicle to continue the unmanned flight, wherein
 the alarm device is disposed on the lower portion of the body of the aerial vehicle and adjacent to the legs of the aerial vehicle, and
 based on recognition of the abnormal situation by the abnormality recognition part during the unmanned flight of the aerial vehicle, the alarm device is detached from the aerial vehicle, descends prior to the aerial vehicle, and activates an alarm mechanism to output warning of abnormality to a neighborhood.

13. The alarm device according to claim 12, further comprising:
 a mounting part attachable to and detachable from the aerial vehicle, wherein
 the mounting part is detached when the abnormality recognition part recognizes the abnormal situation.

14. An aerial vehicle capable of flying in an unmanned manner, the aerial vehicle comprising:
 a body and legs disposed on a lower portion of the body and configured to support the body at a time of landing, wherein the body is configured to accommodate a battery, and an aerial vehicle controller configured to control an unmanned flight of the aerial vehicle that is powered by the battery;
 an abnormality recognition part configured to, during the unmanned flight of the aerial vehicle, receive a signal from the aerial vehicle controller of the aerial vehicle, and recognize, from the received signal, an abnormal situation in which a determination is made that it is difficult to continue the unmanned flight; and
 an alarm device release apparatus configured to release an alarm device, which is disposed on the lower portion of the body of the aerial vehicle and adjacent to the legs of the aerial vehicle, based on recognition of the abnormal situation by the abnormality recognition part, the alarm device being configured to, based on being released from the aerial vehicle, descend prior to the aerial vehicle, and activate an alarm mechanism to output warning of abnormality to a neighborhood.

15. The aerial vehicle according to claim 14, wherein the abnormality recognition part comprises a first abnormality recognizer provided in the body of the aerial vehicle and a second abnormality recognizer provided in the alarm device release apparatus, and
 wherein the alarm device is configured to be detached from the aerial vehicle based on the second abnormality recognizer recognizing the abnormal situation by receiving a signal indicating a determination that the abnormal situation has occurred from the first abnormality recognizer.

16. An alarm device release apparatus mountable to an aerial vehicle that is capable of flying in an unmanned manner, the aerial vehicle comprising a body and legs disposed on a lower portion of the body and configured to support the body at a time of landing, wherein the body is configured to accommodate a battery, and an aerial vehicle controller configured to control an unmanned flight of the aerial vehicle that is powered by the battery, the alarm device release apparatus comprising:
 an abnormality recognition part configured to, during the unmanned flight of the aerial vehicle, receive a signal from the aerial vehicle, and recognize, from the received signal, an abnormal situation in which a determination is made that it is difficult for the aerial vehicle to continue the unmanned flight, wherein
 the alarm device release apparatus is detachably disposed on the lower portion of the body of the aerial vehicle and adjacent to the legs of the aerial vehicle, and
 based on recognition of the abnormal situation by the abnormality recognition part by receiving a signal indicating a determination that the abnormal situation has occurred from the aerial vehicle, the alarm device release apparatus releases an alarm device, the alarm device being configured to, based on being released from the aerial vehicle, descend prior to the aerial vehicle, and activate an alarm mechanism to output warning of abnormality to a neighborhood.

* * * * *